March 15, 1960  I. W. STEVENSON  2,928,954
CONTROL OF PHYSICAL CHARACTERISTICS
Filed July 17, 1957
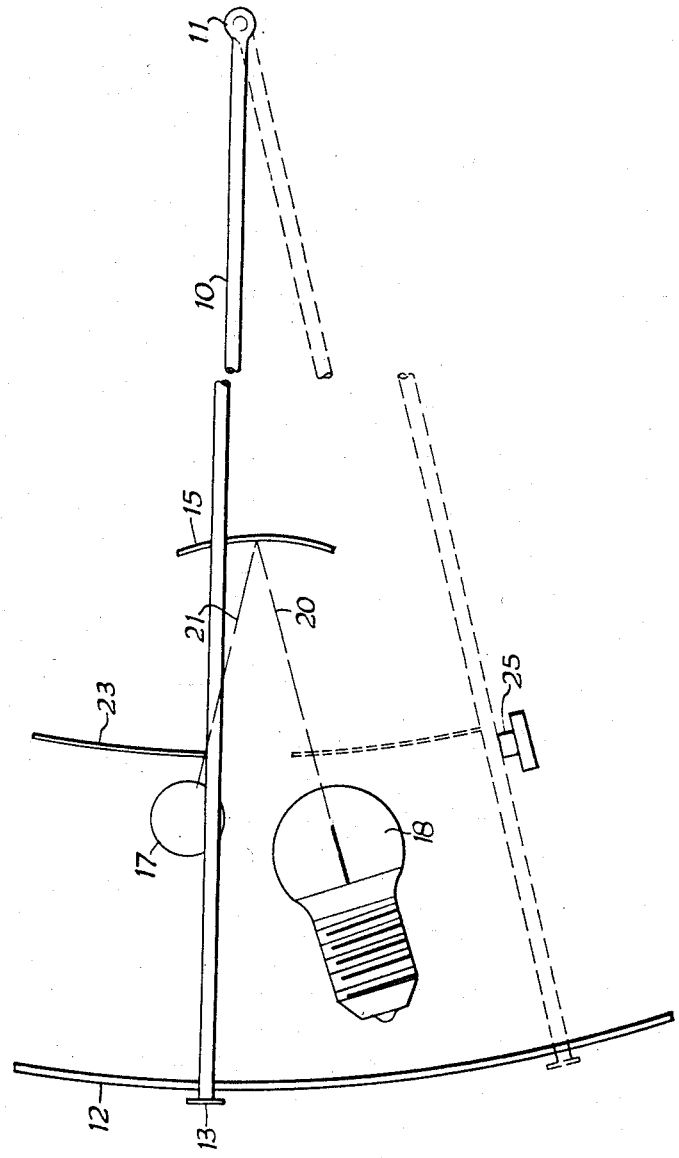
INVENTOR
IAN WATT STEVENSON
BY
Moore &y Hall
ATTORNEY

United States Patent Office 2,928,954
Patented Mar. 15, 1960

2,928,954
CONTROL OF PHYSICAL CHARACTERISTICS

Ian W. Stevenson, Glasgow, Scotland, assignor to Kelvin & Hughes Limited, Glasgow, Scotland Application July 17, 1957, Serial No. 672,413

Claims priority, application Great Britain July 17, 1956

5 Claims. (Cl. 250—230)

This invention relates to the control of variable physical characteristics, such, for example, as temperature.

It has previously been known to use changes in position of a light beam relative to a photoelectric cell to operate a relay or other means in order to cause correction when a variable departs from a predetermined value. In particular, it has been known, in a system for the automatic control of the temperature of a furnace, for a pyrometer needle, displaceable in accordance with the temperature variation of the furnace, to be adapted to interrupt a beam of light passing from a light source to a photoelectric cell, connected in an electric circuit, when a predetermined temperature is reached. When the light beam is interrupted in this manner, the current through the photo cell falls and this is caused to actuate means to adjust the supply of heat to the furnace. This adjustment remains operative until a reverse movement of the pyrometer needle is effected to unmask the beam of light, thus restoring the original condition of heat supply.

In many cases, however, for a short while after the heat supply has been adjusted, the temperature continues to rise and the pyrometer needle is thus further displaced. The extent of this displacement may be such that the needle would move to a position where it no longer interrupts the beam of light falling on the photo cell with the result that the heat supply means would be again adjusted to an "increased heat" position. As can be seen this is highly undesirable and may have dangerous results. It is, therefore, possible to restrain the pyrometer needle by means of a stop from further movement shortly after the control point has been reached but this has always been a disadvantage because it prevents the instrument indicating true temperature above the control point and it is frequently required to know the actual temperature which is reached before the control means begin to be effective. Similar conditions and results may, of course, occur in the case of falling temperatures and control at the lower end of the temperature scale. It might be thought that this problem could be solved by increasing the size of the vane but this is not practicable because when the arm carrying the vane moved to the extremities of the scale, the vane would then require special accommodation necessitating impracticable modifications in the instrument case design. Moreover, it is not desirable to increase the weight of the vane as this would result in increased friction in the system.

The object of this invention is to provide means, in control apparatus of the type referred to, to increase the indicating range of the instrument beyond the control point whilst the control means are still operative.

In accordance with this invention, there is provided apparatus for the control of a variable physical characteristic having a photoelectric cell connected in an electric circuit, means for controlling the characteristic, said means being actuated in response to changes in the current passed by the photoelectric cell, a light source, a reflector upon which light from the light source falls as an incident beam so as to produce a reflected beam which is directed upon the photoelectric cell and means for successively obscuring the said light beams from the photoelectric cell when the region of a predetermined value of the characteristic is reached.

The invention will now be described by way of example, with reference to the accompanying diagrammatic drawing, which shows the essential elements of an apparatus, made in accordance with the invention.

An arm 10 is the deflection member of a pyrometer or like measuring instrument for measuring the variable characteristic and is pivotally mounted at one extremity on a pivot pin 11. At its other extremity, the arm passes over a curved scale plate 12, bearing a scale, and is bent over at right angles to form a pointer 13 which moves over the scale indicating the value of the characteristic on the scale.

Between the scale plate and the pivot, there is provided a curved reflector or mirror 15 which has its reflecting surface directed towards the back of the scale plate 12. A photo cell 17 and a lamp 18 are arranged between the scale plate 12 and the mirror 15 and are so disposed with respect to the scale plate that control is effected at a predetermined point on the scale. The lamp emits a light as an incident beam 20 on to the mirror in the direction away from the scale plate and this beam is directed as a reflected beam 21 onto the photo cell 17 in the direction towards the scale plate. The arm 10 carries a hanging vane 23 which moves with the arm so that as the pointer 13 moves to the region of the value of the characteristic at which control is desired, the vane first intercepts the beam 21 and obscures the light from the photo cell, then intercepts both beams, and on further movement intercepts the beam 20 alone. In this way the vane obscures the light from the photo cell over a required extended part of the scale, e.g. over a pointer movement of say 12 to 15% of the full scale.

The mirror 15 is preferably but not necessarily of the concave type because it then has the additional desirable characteristic that it can concentrate the reflected beam to converge and pass through a sharply defined focal point. If it is arranged that the vane 23 intercepts the reflected beam at this focal point, then the control action is very sharp because the smallest possible movement of the pointer and vane will effectively change the amount of light falling on the photocell to operate the control means.

Preferably the lamp 18 is of the pre-focussing type so that lamps are interchangeable in an instrument without the need for other adjustments.

The photo cell is connected in an electric control circuit of the type, for instance, described in our copending U.K. application nod. 22,075 of 1956. In such a control circuit, a relay or other means is actuated as soon as light ceases to fall on the photo cell, i.e. as soon as the vane intercepts the beam 21. The control therefore remains effective over the extended range of obscuration.

The arm 10 may have its movement restricted by means of a stop 25 in a position (shown in broken lines) in which the vane 23 is still intercepting the beam 20.

The photo cell used in this apparatus is preferably, but not essentially, of the semi-conductor crystal or transistor type. Reference is made to copending application S.N. 672,414, filed July 17, 1957, for Control of Physical Characteristics.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. Apparatus for the control of a variable physical characteristic having a photoelectric cell connected in an electric circuit, means for controlling the characteristic, said means being actuated in response to changes in the current through the photoelectric cell, a light source, a reflector upon which light from said source falls as an incident beam so as to produce a reflected beam which is directed upon the photoelectric cell and light beam obscuring means having a path of travel crossing both said light beams thereby successively obscuring the said light beams from the photoelectric cell when a predetermined value of the characteristic is reached.

2. Apparatus as claimed in claim 1, wherein the light is produced by a lamp which together with the photoelectric cell is arranged with respect to the reflector so that the incident beam from the reflector falls on to the photoelectric cell, and the obscuring means is a vane that moves between the cell and the lamp on one side and the reflector on the other side.

3. Apparatus as claimed in claim 1, wherein the vane is carried by a movable member which also carries a pointer which moves over an indicator plate to indicate the condition of the variable characteristic.

4. Apparatus as claimed in claim 1 wherein the reflector is a concave mirror and the vane intercepts the reflector beam at the focal point of the concave mirror.

5. Apparatus as claimed in claim 1 wherein the lamp is of the pre-focussing type.

References Cited in the file of this patent
UNITED STATES PATENTS 2,077,451    Wilson et al. _____ Apr. 20, 1937